United States Patent [19]

Tsuchida et al.

[11] Patent Number: 5,799,638
[45] Date of Patent: Sep. 1, 1998

[54] DIRECTION INJECTION SYSTEM FOR MULTI-VALVE ENGINE

[75] Inventors: Naoki Tsuchida; Hiroyuki Tsuzuku; Masahisa Kuranishi; Takeshi Ito, all of Iwata, Japan

[73] Assignee: Yamaha Hatsudoki Kabushiki Kaisha, Iwata, Japan

[21] Appl. No.: 878,285

[22] Filed: Jun. 18, 1997

[30] Foreign Application Priority Data

Jun. 19, 1996 [JP] Japan .................... 8-180011

[51] Int. Cl.⁶ .................................... F02B 3/00
[52] U.S. Cl. .................... 123/302; 123/305; 123/308; 123/432
[58] Field of Search ........................ 123/302, 305, 123/308, 432, 193.5, 90.16, 193 H, 188

[56] References Cited

U.S. PATENT DOCUMENTS

| | | | |
|---|---|---|---|
| 5,138,989 | 8/1992 | Fraidl et al. | 123/193.5 |
| 5,203,299 | 4/1993 | Ueda | 123/308 |
| 5,237,974 | 8/1993 | Isomoto et al. | 123/432 |
| 5,347,964 | 9/1994 | Reguiero | 123/90.22 |
| 5,365,900 | 11/1994 | Farnlund et al. | 123/193.5 |
| 5,676,107 | 10/1997 | Yuzuriha et al. | 123/302 |

*Primary Examiner*—Raymond A. Nelli
*Attorney, Agent, or Firm*—Knobbe, Martens, Olson & Bear LLP

[57] ABSTRACT

Two embodiments of multiple-valve engines wherein both the spark plug and fuel injector are mounted in the cylinder head in side-by-side relationship with their axes lying in a common plane. The spark plug and fuel injector axes extend into the combustion chamber recess in an area that is circumscribed by a circle passing through the centers of the valve seats.

21 Claims, 9 Drawing Sheets

DIRECTION INJECTION SYSTEM FOR MULTI-VALVE ENGINE

BACKGROUND OF THE INVENTION

This invention relates to a multi-valve internal combustion engine and more particularly to a direct injection system and cylinder head for such engines.

The use of multiple-valve engines is well known as an expedient for improving the performance of the engine. In fact, four valve per cylinder engines are quite common even for ordinary automotive production car usage. However, five valve per cylinder engines are gaining increasing acceptance, particularly in high-performance applications. These engines normally employ three intake valves and two exhaust valves per cylinder.

Obviously, as the number of valves in the engine increases, the formation of the cylinder head and the related components such as the valve actuating mechanism and the spark plug, if the engine is ignited presents considerable problems.

The use of direct cylinder injection is also quite advantageous in engines. Direct cylinder injection has a number of advantages one of which is that it more easily facilitates operating on a stratified charge principle. By utilizing stratified charge, the entire cylinder need not be filled with a homogenous fuel/air mixture. With stratification, it is only necessary that a stoichiometric mixture be present at the gap of the spark plug at the time of firing. A leaner mixture or even pure air may surround the stratified, stoichiometric patch.

Thus, under low and medium loads it is possible to substantially reduce the amount of fuel in the combustion chamber and still obtain good combustion and good performance. However, the positioning of a direct cylinder injector as well as multiple valves and the spark plug presents considerable problems in cylinder head design.

It is, therefore, a principal object of this invention to provide an improved multi-valve, direct cylinder injected engine.

It is a further object of this invention to provide an improved cylinder head arrangement for a multi-valve engine having direct cylinder injection.

It is a yet further object of the invention to provide a direct cylinder injected multi-valve engine wherein the injector and spark plug may be positioned in close proximity to each other without interfering with the other components.

SUMMARY OF THE INVENTION

This invention is adapted to be embodied in an internal combustion engine having a cylinder head that defines a recess for association with an associated cylinder bore and piston to form a combustion chamber. An intake passage arrangement is formed in the cylinder head and terminates in at least three intake ports formed in the cylinder head recess. An exhaust passage arrangement also is formed in the cylinder head and it extends from at least two exhaust ports formed in the cylinder head recess to an external surface of the cylinder head for discharging exhaust gases to the atmosphere. The intake and exhaust ports are arranged in a generally circular fashion around the axis of the associated cylinder bore. A spark plug and a fuel injector are mounted in side-by-side relationship in the cylinder head with their spark gap and nozzle portions, respectively being surrounded by the centers of the ports. The spark plug and fuel injector have longitudinal axes which lie in a common plane and these axes are disposed at an angle to each other in this common plane.

DETAILED DESCRIPTION OF THE PREFERRED EMBODIMENTS OF THE INVENTION

Embodiment of FIGS. 1–4

A single cylinder of a multiple cylinder internal combustion engine is shown partially in FIGS. 1–4, which depicts a first embodiment of the invention and wherein the engine is identified generally by the reference numeral 11. Because the invention deals primarily with the cylinder head arrangement and its association with the respective cylinder bore, only a single cylinder of the engine is depicted and only the upper portion consisting of the upper portion of the cylinder block in the attached cylinder head are depicted in these figures. It is believed that those skilled in the art will readily understand how the invention can be employed with multiple cylinder engines having a wide variety of configurations.

In fact, the invention may also be employed with single cylinder engines. Also, where any components of the engine are not illustrated or described, any conventional structure known in the art may be employed.

The engine 11 is designed so as to be particularly useful in conjunction with automotive applications wherein the engine is positioned transversely in an engine compartment, an arrangement frequently used in modern automotive practice. The front of the engine is indicated in the drawings by the arrow Fr for orientation purposes.

The engine 11 is comprised of a cylinder block assembly, indicated generally by the reference numeral 12, and an attached cylinder head assembly, indicated generally by the reference numeral 13. The cylinder head assembly 13 is affixed to the cylinder block assembly 12 in any appropriate manner such as by fasteners 14 which appear in FIG. 1.

Figure 1:
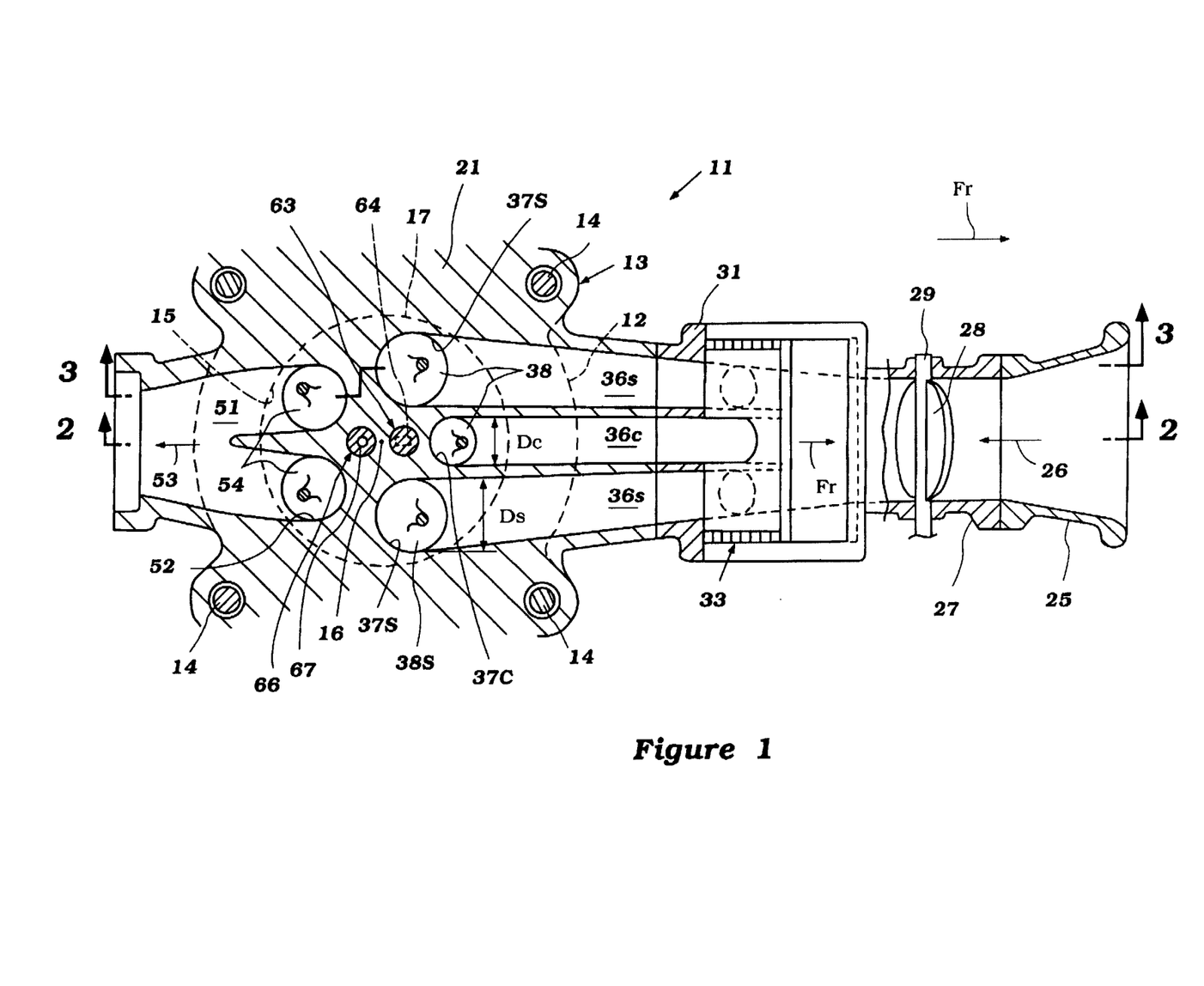
FIG. 1 is a cross-sectional view taken through a cylinder head of a single cylinder of a multi-cylinder, multi-valve internal combustion engine constructed in accordance with a first embodiment of the invention. The plane of the cross-section extends generally through the cylinder head intake and exhaust passages.

The cylinder block 12 is formed with a plurality of aligned cylinder bores 15 having respective axes 16 that lie in a common plane. As previously noted, however, the invention may be employed with engines having other cylinder orientations such as V-type or opposed engines, as will be readily apparent to those skilled in the art.

Pistons 17 reciprocate in the cylinder bores 15 and are connected to connecting rods 18 by means of piston pins 19. The lower ends of the connecting rods 18 are journaled on a crankshaft (not shown) that is rotatably journaled in a crankcase formed at the lower end of the cylinder block 12 in any appropriate manner.

The cylinder head 13 includes a main cylinder head casting 21 which is formed with a recess 22 in its lower surface which cooperates with the cylinder bore 15 and the head of the piston 17 to define the variable volume chamber in which combustion occurs. At times, the cylinder head recess 22 may be referred to as the "combustion chamber" since, at top dead center, it forms the major portion of the combustion chamber volume.

Figure 2:
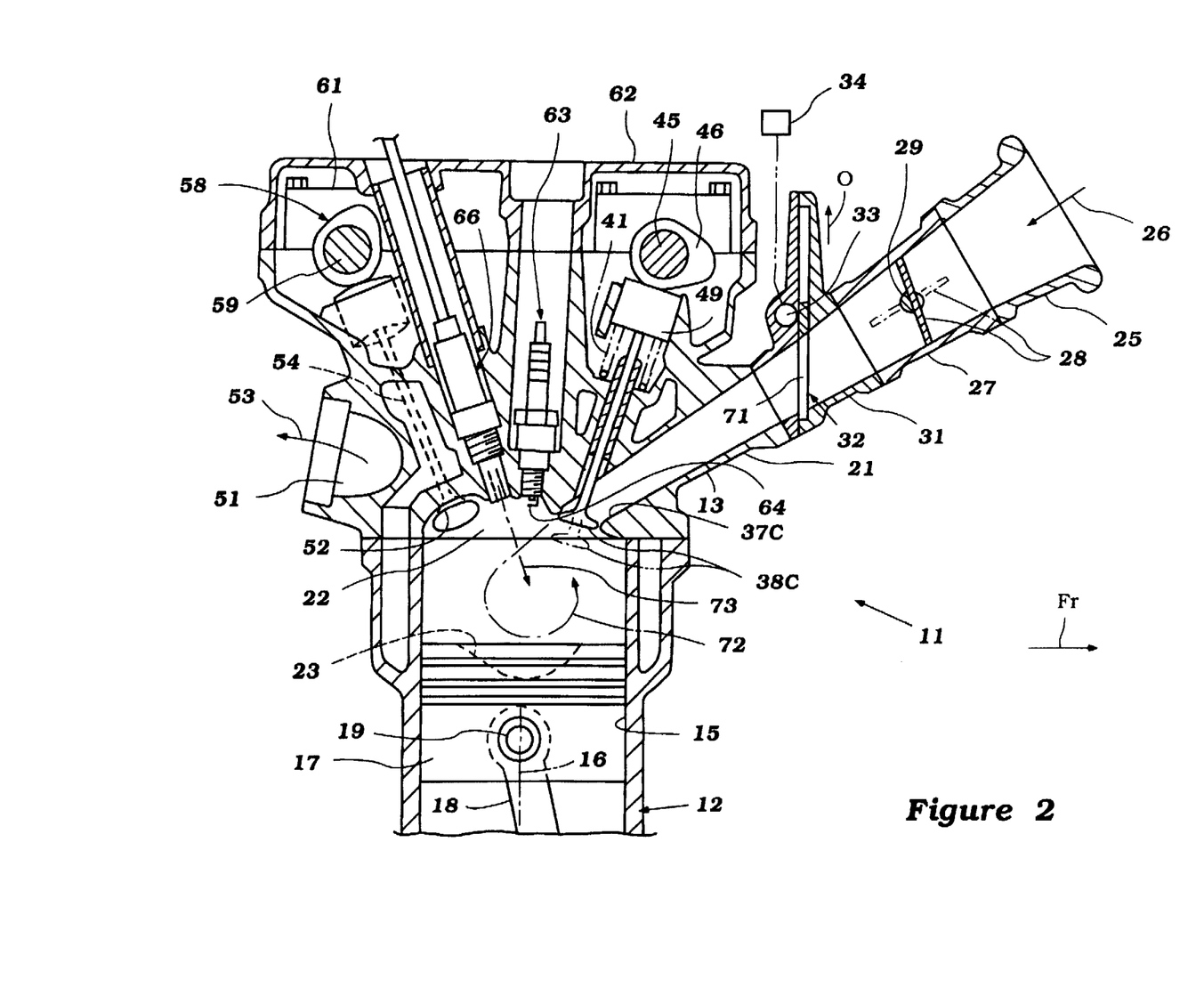
FIG. 2 is a partial cross-sectional view taken along the line 2—2 of FIG. 1 and showing only the cylinder head and upper portion of the cylinder block.

However, the head of the piston 17 is also formed with a recess or bowl 23 which appears partially in FIG. 2. This configuration of the cylinder head recess 22 and the piston bowl 23 forms what is commonly referred to as a "lens shaped" combustion chamber. That is, at top dead center, the clearance volume resembles a convex lens.

An induction system, indicated generally by the reference numeral 24 is formed on the front side of the cylinder head member 21 for delivering an air charge to the combustion chamber 22. This induction system includes an intake air trumpet 25 which may extend into a plenum chamber to which air is delivered in a suitable manner. The direction of airflow is indicated by the reference numeral 26.

The trumpet 25 is connected in a suitable manner to a throttle body 27 in which a flow controlling throttle valve 28 is supported on a throttle valve shaft 29. The throttle valve shaft 29 may run along the length of the engine with a separate throttle body 25 being affixed to the cylinder head for each cylinder bore 15 thereof. Obviously, other types of throttle arrangements may be employed. The throttle valve shaft 29 is operated from a remote throttle control in any known manner.

The throttle body 27 is mounted in stacked relationship to a control valve body 31. This control valve body 31 has a slotted opening that receives a plate-type control valve 32 which is shown in its fully closed, flow-restricting and controlling position in the figures. This control valve 32 is configured so as to provide certain flow relationships into the combustion chamber recess 22 when it is in its flow-controlling position as shown in the figures.

A control valve shaft 33 may be formed with teeth that are engaged with rack-like teeth (not shown) formed on one side of the plate-type control valve 32 for effecting its opening and closing. The direction of opening movement is indicated by the arrow O in FIGS. 2 and 3.

The control valve shaft 33 is operated by a remotely positioned servo motor 34 that is controlled by an ECU in accordance with any desired strategy. Basically, the control valve 32 is left in its flow-restricting and flow-redirecting position under idle and low mid-range performance and is opened when the engine is operating under higher speeds and loads. The induction path formed by the trumpet 25 and throttle body 27 is a generally cylindrical path which is bifurcated in the control valve body 33 into three intake passages, each indicated by the reference numeral 36. These intake passages 36 are comprised of a center intake passage, 36c, and a pair of side intake passages, 36s.

Each intake passage 36 terminates in a respective valve seat 37 with the center valve seat being indicated at 37c and the side valve seats being indicated by the reference characters 37s. It should be noted that the centers of the valve seats 37 lie roughly on a circle that is generally concentric with the cylinder bore axis 16. Also, the center intake passage 36c and center valve seat 37c have a smaller diameter Dc than the diameters Ds of the side intake passages 36s and side valve seats 37s. The reason for this will also be described later.

Poppet-type intake valves 38 are slidably supported in the cylinder head casting 21 by valve guides 39 which are pressed or otherwise suitably affixed in place. The valves associated with the valve seats are also indicated by the respective characters "c" or "s" depending upon whether they are side or center valves.

It should be noted that the valve seats 37 are disposed so that they lie substantially on one side of a longitudinal plane containing the cylinder bore axes 16 and the axis of rotation of the associated crankshaft. The side intake valve seats 37s extend into the recess 22 slightly over this plane.

Each of the valves 38 is urged toward its closed position by a respective valve spring 41 that acts against the cylinder head member 21 and a retainer assembly that is affixed to the upper end of the respective valve stem. One of these keeper retainers appears in FIG. 3 and is identified by the reference numeral 42.

Figure 3:
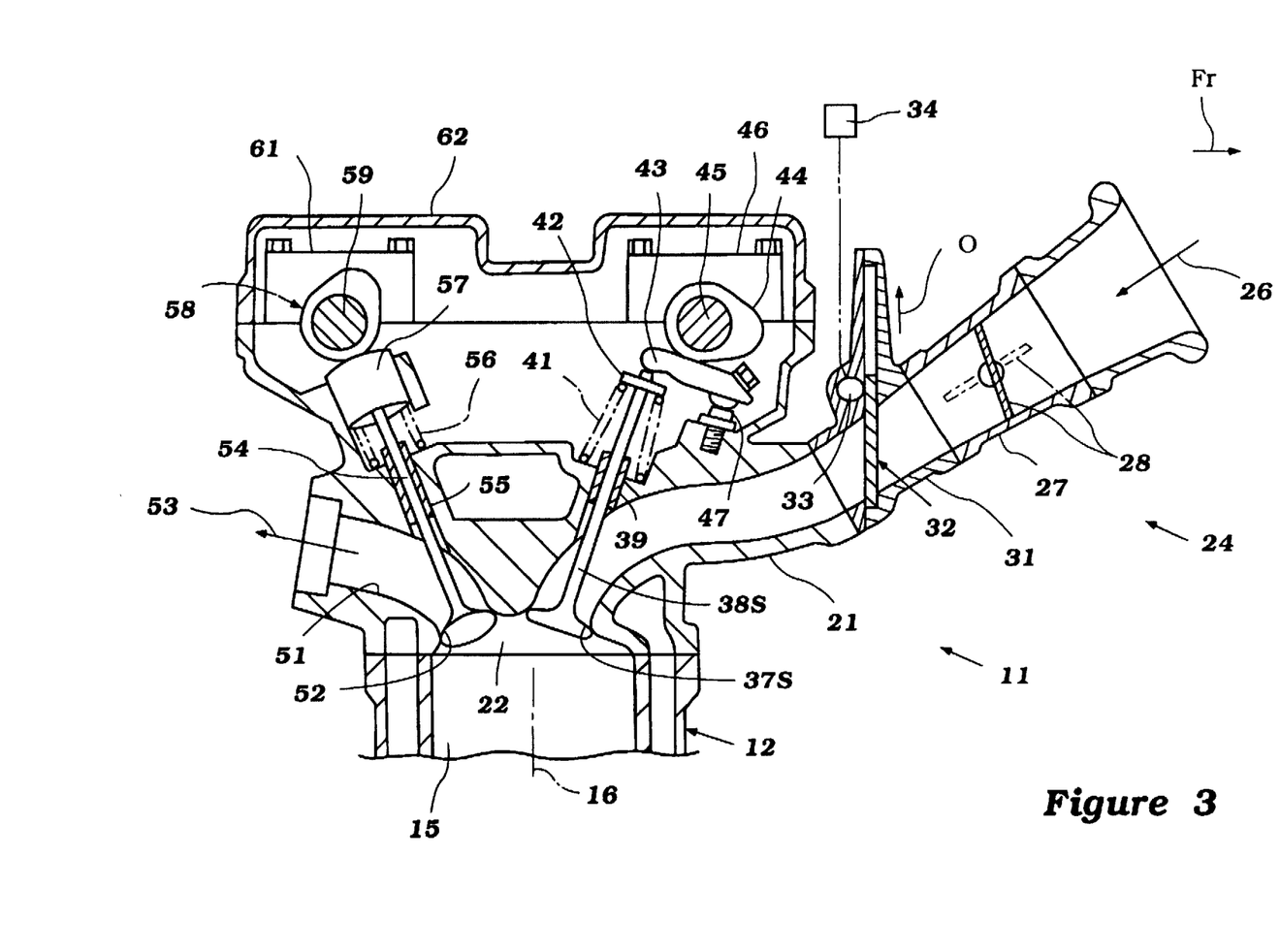
FIG. 3 is a partial cross-sectional view taken along the line 3—3 of FIG. 2 and again only shows the cylinder head and upper portion of the cylinder block.

These keeper retainers of the side intake valves 38s are exposed because these valves are operated indirectly through rocker arms 42 that are actuated by the lobes 44 of an intake camshaft 45. The intake camshaft 45 is journaled in the cylinder head member 21 by integral bearing surfaces formed therein and by bearing caps 46 that are affixed to the cylinder head member 21 in a known manner.

The rocker arm 43 are journaled on spherical pivots 47 fixed to the cylinder head assembly 21 in a known manner. It will be seen that the axis of rotation of the intake camshaft 45 is disposed transversely outwardly from the aforenoted longitudinal plane containing the cylinder bore axis 16. The rocker arm pivots define axes that are spaced even further from the longitudinal plane. This outward placing of the camshaft 45 is for a purpose which will be described later.

It should be noted that the intake camshaft 45 is driven from the crankshaft at one-half crankshaft speed by any known type of timing drive arrangement.

The camshaft 45 also is formed with center lobes 48 that directly operate the center intake valves 38c via thimble tappets 49.

A Siamese exhaust passage, indicated generally by the reference numeral 51, is associated with each cylinder bore 12 on the opposite side of the aforenoted longitudinal plane containing the cylinder bore axis 16 from the cylinder head intake passages 36. This exhaust passage 52 extends from exhaust valve seats 52 that are formed in the cylinder head recess 22 on this exhaust side of the cylinder head. The exhaust gases flow in the direction of the arrow 53 and the exhaust gases are discharged to the atmosphere through any suitable exhaust system (not shown).

Exhaust valves 54 are slidably supported in the cylinder head member 21 by valve guides 55. Like the intake valve guides 39, the exhaust valve guides 55 are fixed to the cylinder head 21 in any appropriate manner. The exhaust valves 54 have heads that valve the valve seats 52. It should be noted that the diameters of the exhaust valve seats 52 is larger than the diameter of the center intake valve seat 37c but which is smaller than the diameter of the side intake valve seats 37s. Although this is a preferred relationship, other orientations and sizes may be chosen.

The centers of the exhaust valve seats 52 also lie generally on the same rough circle as those of the intake valve seats 37. It should be noted that the centers do not lie exactly at the same distance from the cylinder bore axis 16 so this is a circle only in general configuration and not a perfect circle. This approximate relationship is referred to herein and in the Claims as "circular." Again, however, various relationships can be employed.

The exhaust valves 54 are urged to their closed positions by means of coil compression springs 56 that act against the cylinder head member 21 and keeper retainer assemblies affixed to the stems of the exhaust valves 54 and which do not appear in the figures. Thimble-type tappets 57 are associated with each of the exhaust valves 56 and are operated by the lobes 58 of an exhaust camshaft 59.

The exhaust camshaft 59 is journaled for rotation in the cylinder head member 21 by integral bearing surfaces formed therein and by bearing caps 61 that are affixed to the cylinder head member 21 in a known manner. The rotational axes of the camshafts 45 and 59 are generally parallel to each other with the rotational axis of the exhaust camshaft 59 being spaced further from the plane containing the cylinder bore axis 16 than that of the intake camshaft 45. This is done in part so as to permit direct action of the exhaust valves 54 and also for another purpose which will be described shortly. The exhaust camshaft 59 is, like the intake camshaft 45 driven by a suitable timing drive from the crankshaft.

This valve and actuating mechanism which has been thus far described is contained within a cam chamber formed in the cylinder head assembly 13 by the cylinder head member 21 and a cam cover 62 that is affixed thereto in a known manner.

It should be noted that the cam lobes 58 associated with the exhaust valves 54 and the intake cam lobes 44 associated with the side intake valves 37 are tapered because the axes of these valves are also skewed from a plane that extends perpendicular to the aforenoted longitudinal plane containing the cylinder bore axis 16 and also containing this axis.

A spark plug, indicated generally by the reference numeral 63, is mounted in the cylinder head member 21 in a tapped opening formed therein. The spark plug 63 is mounted so that it has a longitudinal axis which is generally upstanding and which extends generally parallel to the cylinder bore axis 16. However, there is a slight skewing of this axis in an upwardly extending direction from its spark gap 64 which extends into the cylinder head recess 22 toward the intake side of the engine or the front side thereof. It should be seen that the offsetting of the center intake valve seat 37 and its smaller diameter permits the spark plug 63 to be positioned generally between the side intake valves 38s and their actuating rocker arm mechanism. The rocker arm actuation of these valves also facilitates this mounting of the spark plugs 63 so that the spark gap 64 will be positioned at the approximate geometric center of the volume of the combustion chamber 22.

The spark plugs 63 are fired by any suitable ignition system and the positioning of the spark plugs as afore- described facilitates the accessing of the spark plugs for the connection of a terminal thereto. Alternatively, the positioning is such that direct coils may be mounted on the spark plug 63 in the wells 65 formed by the cylinder head member 21 and the cam cover 62.

A fuel injector, indicated generally by the reference numeral 66, is mounted in the cylinder head assembly 13 also in a generally central location in the cylinder head recess 22. This fuel injector has a central flow passage 67 that terminates in a nozzle opening in the cylinder head recess 22. A pintle type valve (not shown) opens and closes this nozzle opening for controlling the admission of fuel to the combustion chamber 22. Fuel is supplied to the fuel injector 66 by any suitable fuel supply system which is not shown but which is also readily accessible.

The axis of the flow passage 67 and generally the axis of the fuel injector 66 and the axis of the spark plug 63 lie in a common plane that is perpendicular to the longitudinal plane and which is a transverse plane in this embodiment. The fuel injectors 67 will spray fuel in a path that is illustrated by the arrow 68 in FIG. 2 and which is disposed in proximity to the center intake passage 36c and the center valve seat 37c.

Figure 4:
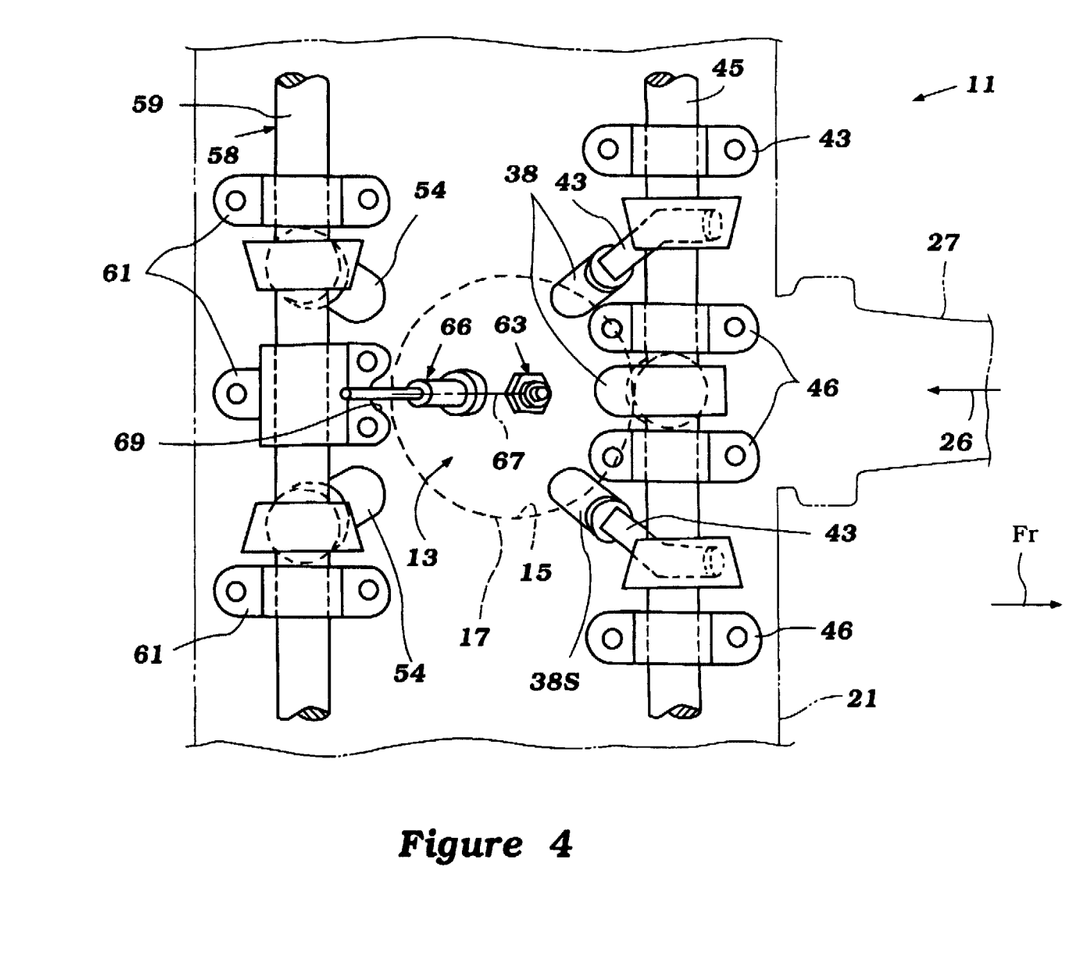
FIG. 4 is a partially schematic top plan view of the cylinder head showing only the valve operating mechanism, fuel injector and spark plug in solid lines with remaining components of the engine shown in phantom lines.

As may be seen in FIG. 4, the bearing cap 61 associated with the exhaust camshaft 59 between the paired exhaust valves 64 for each cylinder is formed with a recessed portion 69. This clears the fuel injectors 66 which are positioned generally between the exhaust valve seats 52 but is spaced closer to the cylinder bore axis 16 than the center of these seats.

The central location of the fuel injector 66 in close proximity to the spark plug 63 and its spark gap 64 permits a stratification of the charge under low speeds and low loads. Also, the control valve 32 ensures and assists in maintaining this stratification.

As has been previously noted, the control valves 32 are maintained in their closed or flow-controlling position under these low speed and load ranges. The valve plate 32 is formed with a recessed portion 71 which permits flow to the combustion chamber 22 only through the center intake valve seat 37 when operating at low speeds and low loads. Thus, there will be generated a tumble action indicated by the arrow 72 in FIG. 2 which will impact upon the fuel sprayed in the direction of the arrow 73 and to cause this fuel spray to be consolidated and swept into proximity with the spark plug gap 64 so as to ensure the presence of a stoichiometric mixture patch at the time of spark plug firing.

Under higher speeds and higher loads, the control valve plate 32 is moved to its open position and the flow of air into the combustion chamber recesses 22 through the side intake passages 36s and side intake valve seats 37s will be permitted to afford a more homogenous mixture through the entire combustion chamber. Of course, the amount of fuel injected under this running condition is substantially greater so as to permit the attainment of high-power outputs. However, this is done without any expense of low-speed fuel economy and emission control because of the stratified action as aforedescribed.

Figure 5:
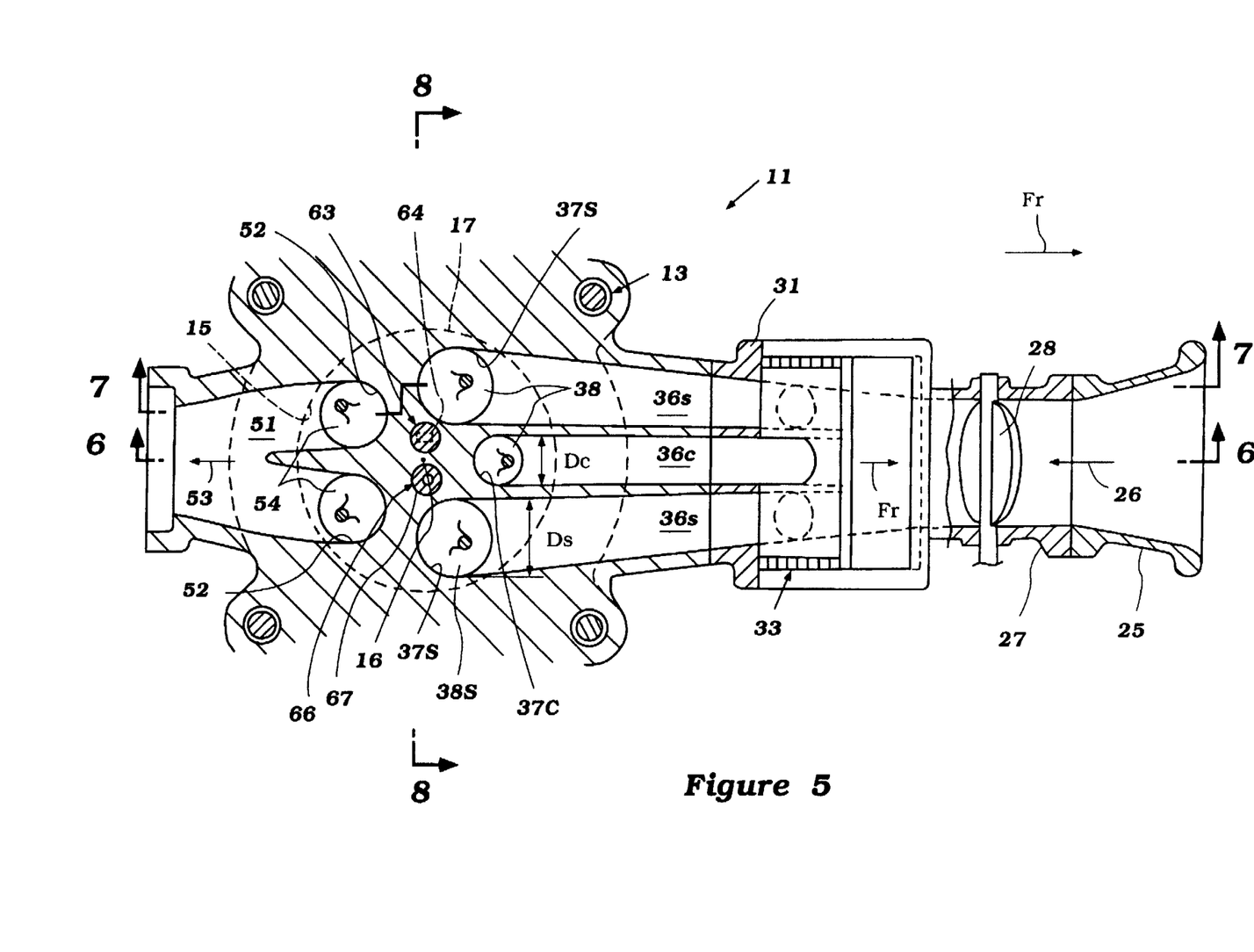
FIG. 5 is a cross-sectional view, in part similar to FIG. 1 and shows another embodiment of the invention.
Figure 6:
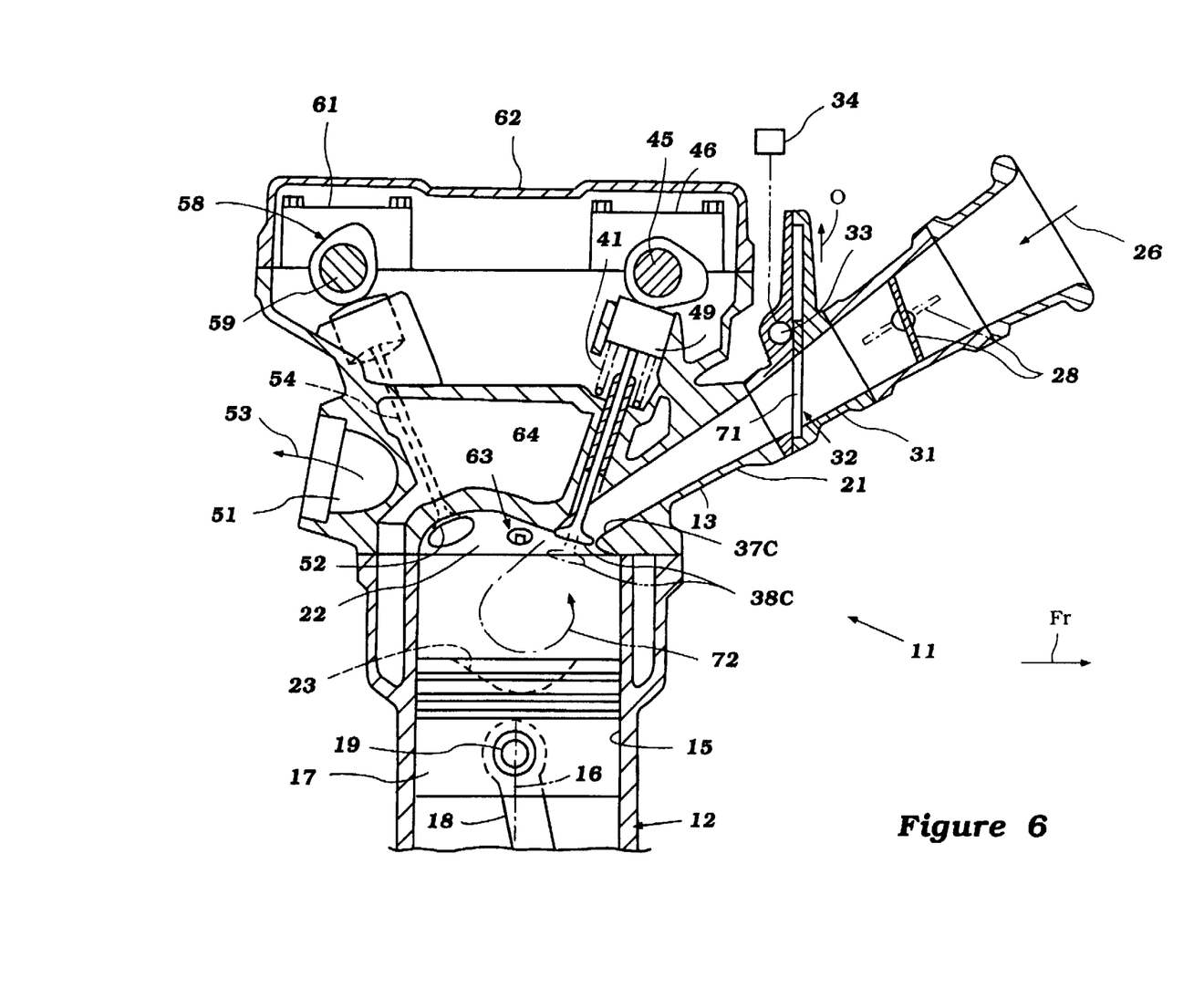
FIG. 6 is a cross-sectional view taken along line 6—6 of FIG. 5 showing only the cylinder head and upper portion of the cylinder block and again only shows the cylinder head and upper portion of the cylinder block.
Figure 7:
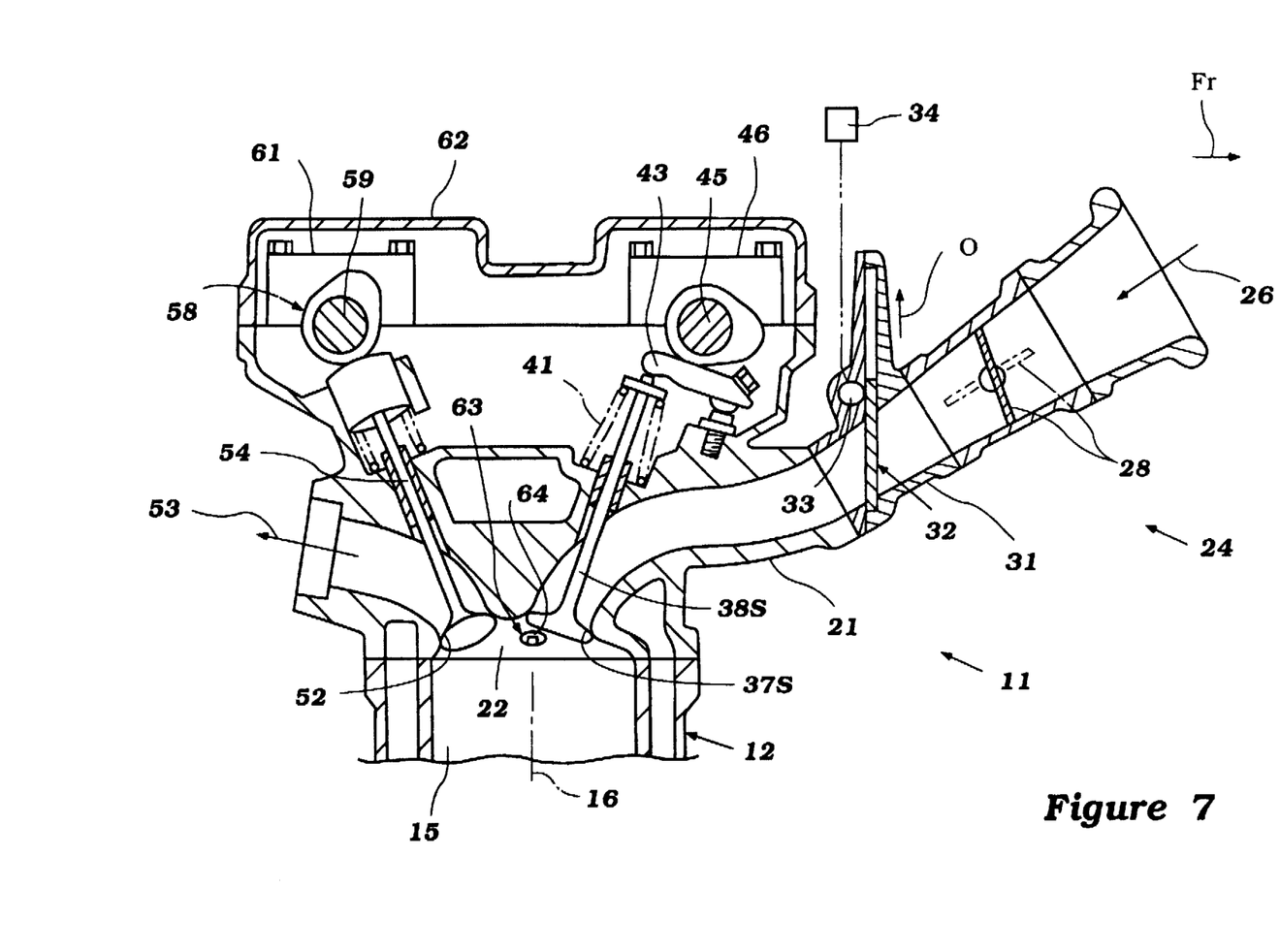
FIG. 7 is a cross-sectional view taken along the line 7—7 of FIG. 5 and again only shows the cylinder head and upper portion of the cylinder block.
Figure 9:
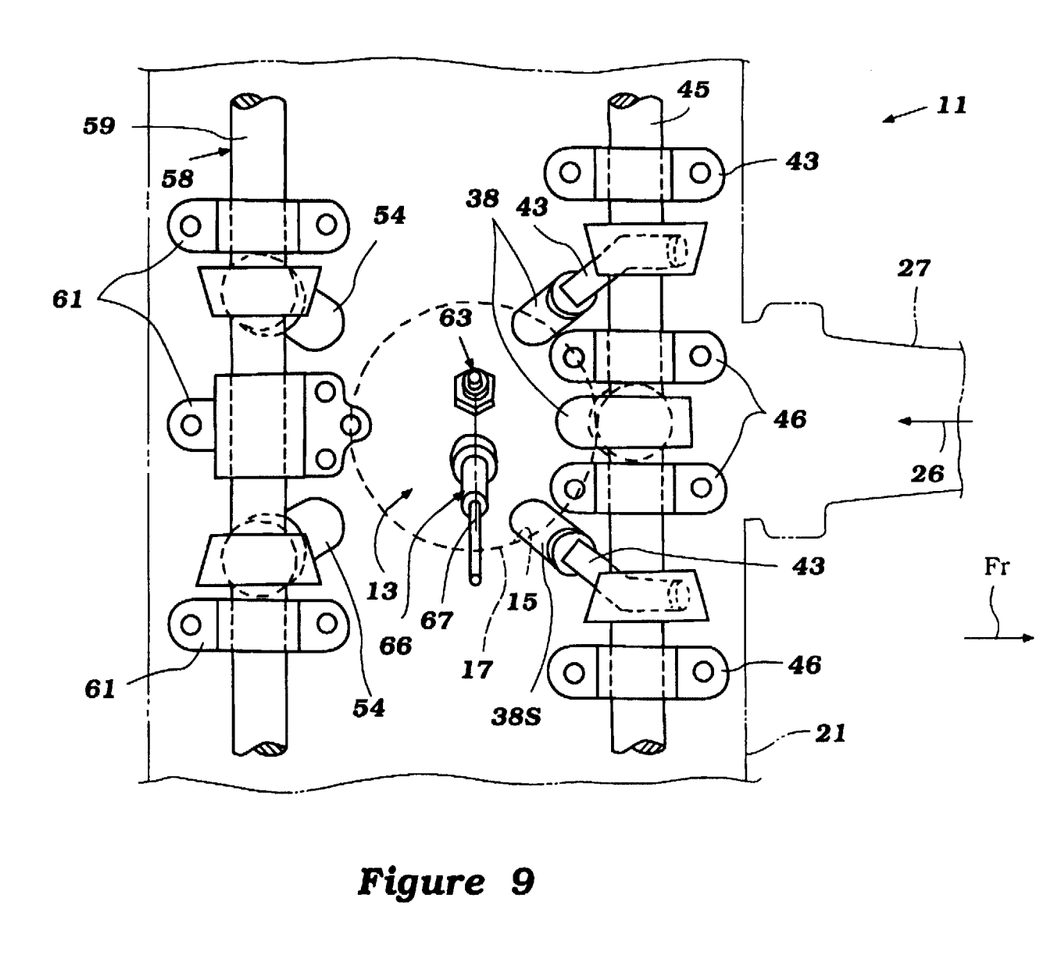
FIG. 9 is a partially schematic top plan view showing the cylinder head of this embodiment with the valve actuating mechanism fuel injector and spark plug being shown only in solid lines and the remaining components being shown in phantom.

Embodiment of FIGS. 5 . 9

FIGS. 5 . 9 show another embodiment of the invention which is similar to the embodiment as thus far described. That is, the basic configuration of the engine and its intake passages and exhaust passages and valves and valve actuation is the same as that already described. For that reason, components of this embodiment that are the same or substantially the same as the previously-described embodiments have been identified by the same reference numerals. For the same reason, those similar or same components will be described again by reference to these figures only insofar as is necessary to understand the construction and operation of this embodiment.

In this embodiment, the central axes of the spark plug 63 and fuel injector 66 are disposed in a longitudinally extending plane containing the cylinder bore axis 16. Thus, the spark plug 63 is positioned with its spark gap 64 adjacent one of the side intake valve seats 38s while the fuel injector axis 67 is disposed adjacent the other of the side intake valve seats 37s. However, the spacing between these valve seats is sufficient so as to accommodate this spacing.

Figure 8:
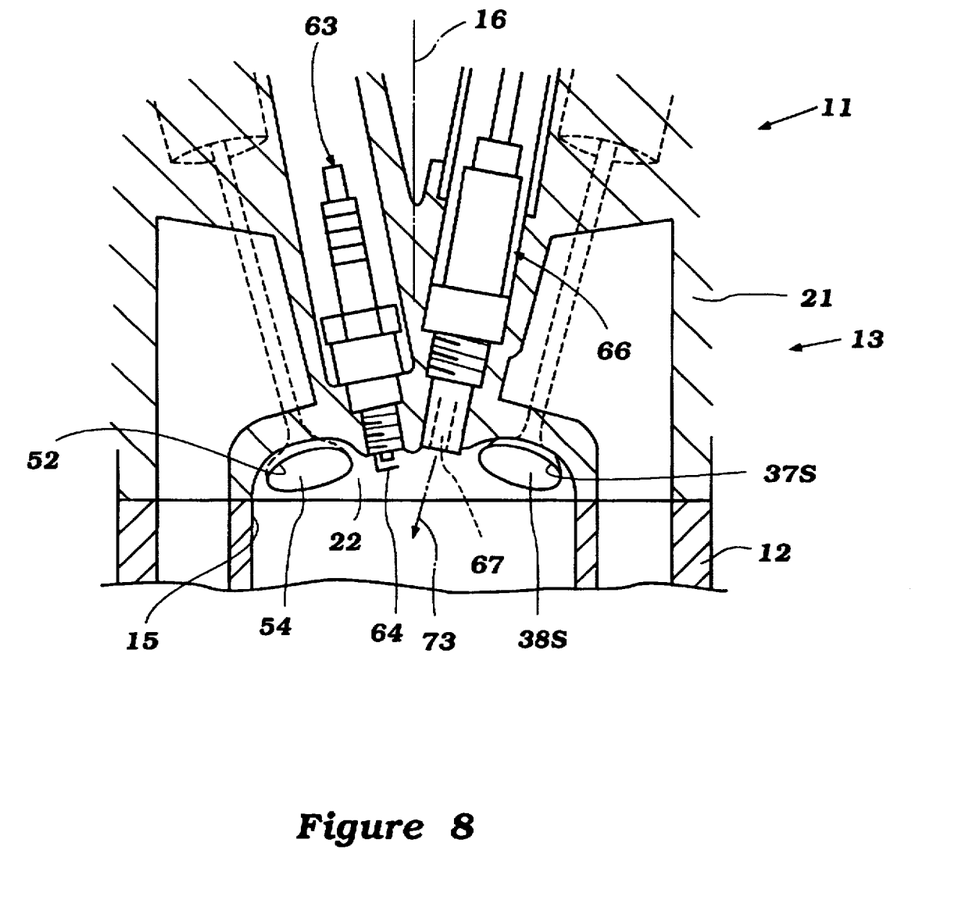
FIG. 8 is a partial cross-sectional view taken along the line 8—8 of FIG. 5 and again only shows the cylinder head and upper portion of the cylinder block.

In this embodiment, both the axis of the spark plug 63 and that of the fuel injector spray nozzle 67 are disposed at acute angles to each other and to the actual cylinder bore axis 16 but on opposite sides of this axis as is readily apparent from FIG. 8.

Thus, from the foregoing description, it should be readily apparent that the described embodiments permit the use of direct cylinder fuel injection for multi-valve engines and particularly engines having five or more valves per cylinder without interference between the components and while still being able to maintain stratification of the charge under low-speed, low-load conditions and obtain a homogenous mixture under full-load, high-speed conditions. Of course, the foregoing description is that of preferred embodiments of the invention and various changes and modifications may be made without departing from the spirit and scope of the invention, as defined by the appended claims.

What is claimed is:

1. A cylinder head assembly for a multi-valve internal combustion engine comprised of a cylinder head having a recessed surface adapted to cooperate with a cylinder bore of an associated cylinder block and a piston to form a combustion chamber, an intake passage arrangement extending to at least three intake valve seats formed in said cylinder head recess, an exhaust passage arrangement extending from a pair of exhaust valve seats formed in said cylinder head recess to an outlet formed in an outer surface of said cylinder head for delivering exhaust gases from said combustion chamber to the an associated exhaust system, said intake and exhaust valve seats having their centers arranged substantially on a circle, a spark plug mounted in said cylinder head and having its spark gap disposed in said recess, and a fuel injector nozzle mounted in said cylinder head and having its discharge port disposed in said recess, said spark plug and said fuel injector having respective axes lying in a common plane and disposed in nonparallel relationship to each other.

2. A cylinder head assembly as set forth in claim 1, wherein the axis of one of the spark plug and the fuel injector is substantially parallel to the cylinder bore axis.

3. A cylinder head assembly as set forth in claim 2, wherein the axis of the spark plug is parallel to the cylinder bore axis.

4. A cylinder head assembly as set forth in claim 1, wherein both of the spark plug and fuel injector axes are disposed at an acute angle to the cylinder bore axis.

5. A cylinder head assembly as set forth in claim 1, wherein the intake valve seats lie substantially on one side of a longitudinal plane containing the axis of the cylinder bore and the exhaust valve seats lie on the other side of the longitudinal plane.

6. A cylinder head assembly as set forth in claim 5, wherein the plane containing the axes of the spark plug and the fuel injector is substantially parallel to the longitudinal plane.

7. A cylinder head assembly as set forth in claim 6, wherein the side intake valve seats extend partially over the longitudinal plane and the fuel injector and spark plug are disposed at least in substantial part between the side intake valve seats.

8. A cylinder head assembly as set forth in claim 7, wherein the axes of the spark plug and fuel injector are both inclined to the cylinder bore axis.

9. A cylinder head assembly as set forth in claim 8, wherein the inclination of the spark plug and fuel injector axes is such that the ends thereof remote from the recess are spaced farther apart than the ends in the recess.

10. A cylinder head assembly as set forth in claim 5, wherein the plane containing the axes of the spark plug and fuel injector extends perpendicularly to the longitudinal plane.

11. A cylinder head assembly as set forth in claim 10, wherein one of the fuel injector and spark plug is disposed between the side intake valve seats and the other of the spark plug and fuel injector is disposed between the exhaust valve seats.

12. A cylinder head assembly as set forth in claim 11, wherein one of the axes of the fuel injector and spark plug is substantially parallel to the cylinder bore axis.

13. A cylinder head assembly as set forth in claim 12, wherein the axis of the spark plug is substantially parallel to the cylinder bore axis.

14. A cylinder head assembly as set forth in claim 13, wherein the spark plug is between the side intake valve seats.

15. A cylinder head assembly as set forth in claim 1, further including a camshaft rotatably journaled in the said cylinder head assembly, and operating means for operating at least one of said intake valves directly from said camshaft and for operating at least another one of said intake valves from said camshaft through a rocker arm.

16. A cylinder head assembly as set forth in claim 15, wherein the center intake valve is operated directly from the camshaft.

17. A cylinder head assembly as set forth in claim 16, wherein the tip end of the center intake valve is disposed further from the longitudinal plane than the tip ends of the side intake valves and wherein both of the side intake valves are operated by rocker arms and wherein a separate cam lobe is provided for operating each of said intake valves.

18. A cylinder head assembly as set forth in claim 17, wherein the pivot point of the rocker arm on the cylinder head is disposed outwardly of the rotational axis of the intake camshaft.

19. A cylinder head assembly as set forth in claim 5, further including a control valve for restricting the flow through the side intake valve seats under at least some running conditions.

20. A cylinder head assembly as set forth in claim 19, wherein the some running conditions are low speed and load.

21. A cylinder head assembly as set forth in claim 19, wherein the center intake valve seat has a smaller diameter than either of the side intake valve seats.

* * * * *

UNITED STATES PATENT AND TRADEMARK OFFICE
CERTIFICATE OF CORRECTION

PATENT NO. : 5,799,638
DATED : September 1, 1998
INVENTOR(S) : Tsuchida et al.

It is certified that error appears in the above-identified patent and that said Letters Patent is hereby corrected as shown below:

<u>Title page,</u>
Title should read -- DIRECT INJECTION SYSTEM FOR MULTI-VALVE ENGINE --.

Signed and Sealed this

Sixth Day of November, 2001

*Attest:*

NICHOLAS P. GODICI
*Attesting Officer*    Acting Director of the United States Patent and Trademark Office